US009532581B2

(12) United States Patent
Heemskerk et al.

(10) Patent No.: US 9,532,581 B2
(45) Date of Patent: Jan. 3, 2017

(54) APPARATUS AND METHOD FOR REMOVING THE ENTRAILS FROM THE ABDOMINAL CAVITY OF POULTRY

(71) Applicant: Meyn Food Processing Technology B.V., Oostzaan (NL)

(72) Inventors: Wilhelmus Johannes Casper Heemskerk, Oostzaan (NL); Dirk Hermen Van der Waal, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 14/546,114

(22) Filed: Nov. 18, 2014

(65) Prior Publication Data

US 2015/0140911 A1    May 21, 2015

(30) Foreign Application Priority Data

Nov. 19, 2013  (NL) ...................................... 2011818

(51) Int. Cl.
*A22C 21/06*    (2006.01)
*A22C 21/00*    (2006.01)

(52) U.S. Cl.
CPC ........... *A22C 21/06* (2013.01); *A22C 21/0046* (2013.01); *A22C 21/0053* (2013.01)

(58) Field of Classification Search
CPC ............................... A22C 21/00; A22C 21/06
USPC ........................................ 452/106, 111, 117
See application file for complete search history.

(56) References Cited

U.S. PATENT DOCUMENTS

| 3,685,096 | A | * | 8/1972 | Harben, Jr. ................... 452/118 |
| 4,019,222 | A | * | 4/1977 | Scheier et al. ................ 452/117 |
| 4,262,387 | A | * | 4/1981 | Scheier et al. ................ 452/117 |
| 5,186,679 | A |   | 2/1993 | Meyn |
| 5,549,521 | A | * | 8/1996 | van den Nieuwelaar et al. ............................. 452/118 |
| 5,766,063 | A | * | 6/1998 | Hazenbroek et al. ......... 452/117 |
| 5,993,308 | A | * | 11/1999 | Martin et al. ................. 452/177 |
| 6,811,478 | B2 | * | 11/2004 | van den Nieuwelaar et al. ............................. 452/117 |

FOREIGN PATENT DOCUMENTS

| EP | 0530868 A1 | 3/1993 |
| EP | 1222858 A2 | 7/2002 |

OTHER PUBLICATIONS

Search report for NL 2011818, dated Aug. 3, 2014.

\* cited by examiner

*Primary Examiner* — David Parsley
(74) *Attorney, Agent, or Firm* — Dority & Manning, P.A.

(57) ABSTRACT

An apparatus and method for removing the entrails from the abdominal cavity of poultry suspended by its legs in a first conveyor. The apparatus includes an evisceration tool which is movable into and out of the abdominal cavity of the poultry for removing the entrails from the abdominal cavity. The apparatus provides for gripping the entrails after their removal from the abdominal cavity.

12 Claims, 3 Drawing Sheets

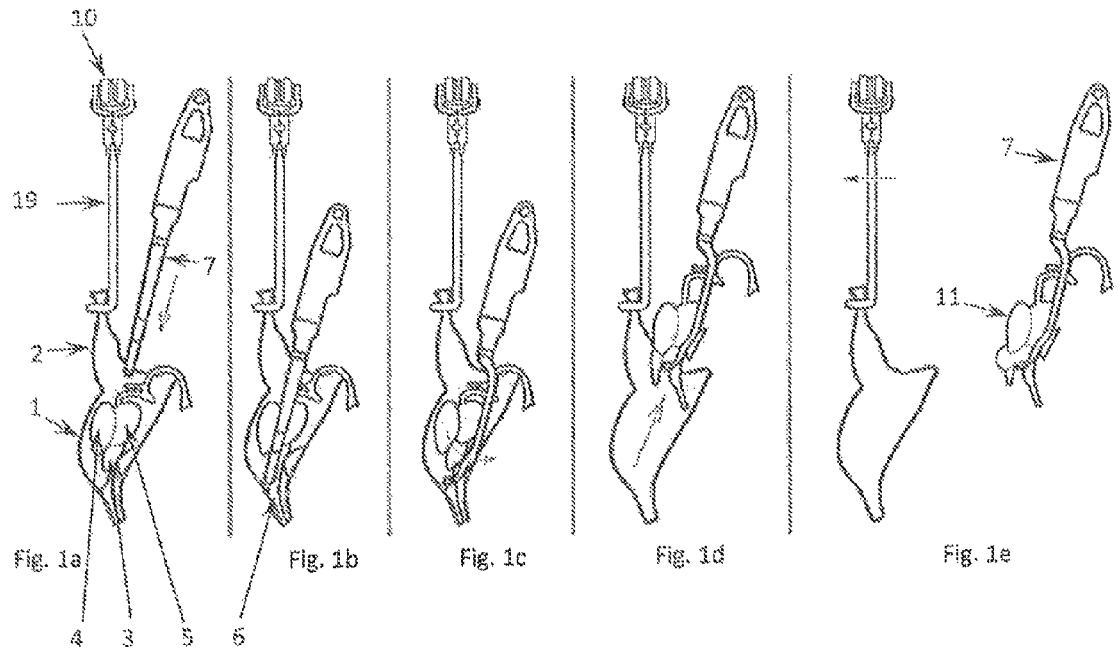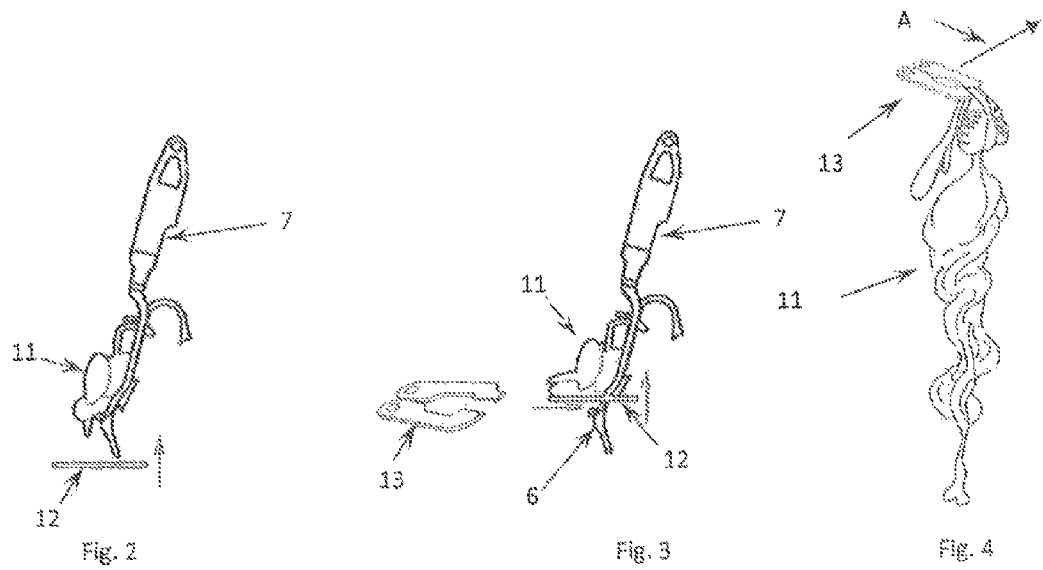

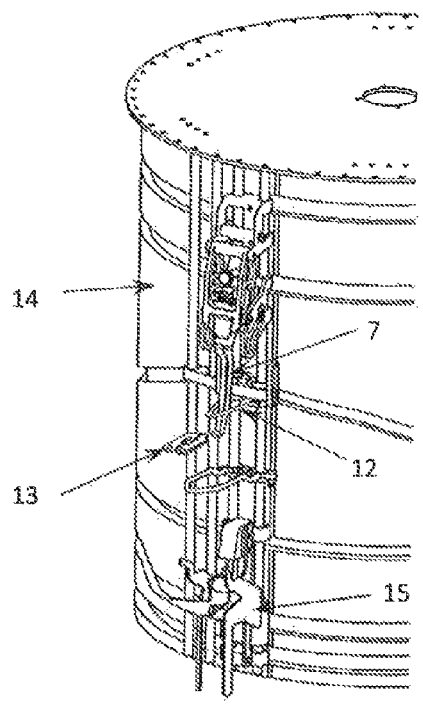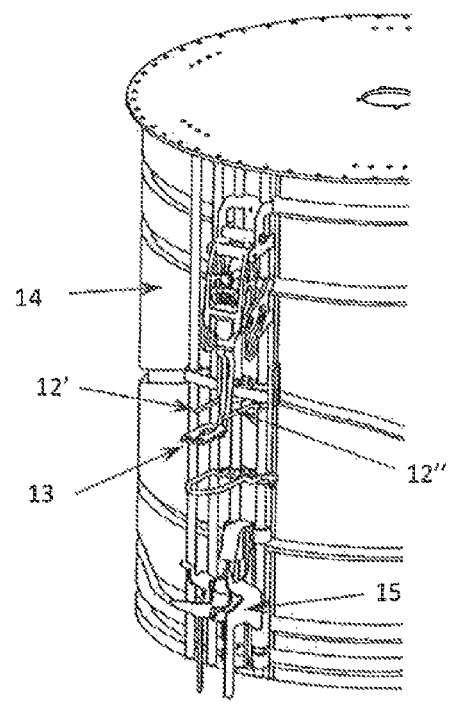
Fig. 8    Fig. 9
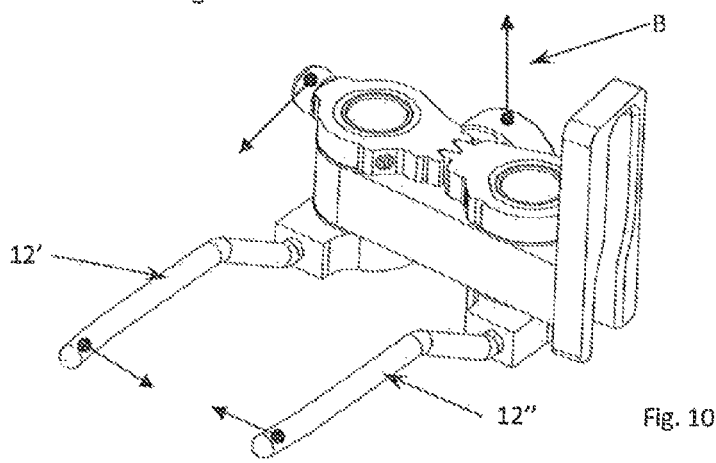
Fig. 10
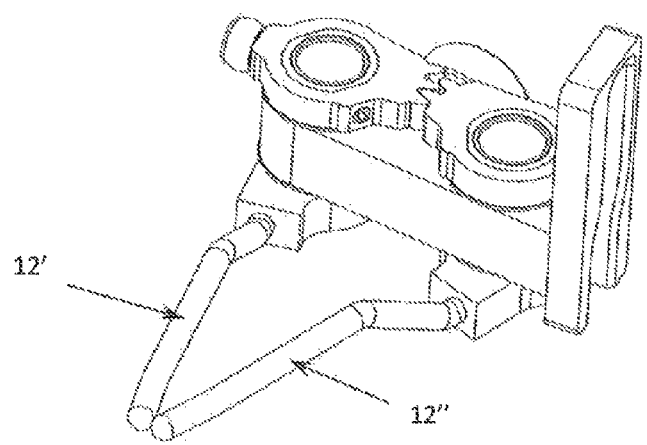
Fig. 11

APPARATUS AND METHOD FOR REMOVING THE ENTRAILS FROM THE ABDOMINAL CAVITY OF POULTRY

PRIORITY CLAIM

The Present application claims priority under 35 U.S.C. §119 to Dutch Application No. 2011818, filed Nov. 19, 2013.

FIELD OF THE INVENTION

The invention relates to a method and apparatus for removing the entrails from the abdominal cavity of poultry suspended by its legs.

BACKGROUND OF THE INVENTION

From EP-A-0 530 868 an apparatus is known that includes an evisceration tool which is movable into and out of the abdominal cavity of poultry for removing the entrails from the abdominal cavity. Gripping means are employed for gripping the entrails after their removal from the abdominal cavity.

Although the invention according to EP-A-0 530 868 was ahead of its time when it was reduced to practice, in the interim it has been widely accepted throughout the industry. In practice it is found that transferring the entrails to the gripping means may become difficult, particularly when in accordance with current day practice the poultry is suspended by its legs in a conveyor which is moving at high speed, that is to say at least 4000 chickens per hour.

SUMMARY OF THE INVENTION

It is an object of the invention to alleviate gripping of the entrails after their removal from the abdominal cavity of the poultry.

It is a further object of the invention to promote the high processing speeds that are required in current apparatus for removing entrails from the abdominal cavity of poultry.

It is still a further object of the invention to provide an alternative for the prior art apparatus for removing entrails from the abdominal cavity of poultry.

These and other objectives of the invention which may become apparent from the following disclosure, are at least in part attained with the exemplary apparatus and method for removing entrails from the abdominal cavity of poultry in accordance with the appended claims.

In a first exemplary aspect of the invention a method is proposed for removing entrails from an abdominal cavity of poultry, the entrails comprising a heart, liver, gizzard, pre-gizzard and oesophagus. During removal of the entrails, the poultry is suspended by its legs in a first conveyor, wherein an evisceration tool is moved into and out of the abdominal cavity of the poultry for removing the entrails from the abdominal cavity. The entrails are gripped and taken from the evisceration tool after their removal from the abdominal cavity. The entrails are lifted at least in part from the evisceration tool before being gripped and taken from the evisceration tool.

In one exemplary embodiment, this exemplary method can suitably be realized by an apparatus that includes lifting means arranged to be introduced below the evisceration tool after its removal from the abdominal cavity, and arranged to undertake a relative upwards motion with respect to the evisceration tool so as to lift at least part of the entrails from the evisceration tool and give way to enable the gripping means to grip the entrails below the lifting means.

In an exemplary embodiment, the lifting means includes a bracket that is movable in a substantially vertical direction, which is essentially the direction that gravity forces operate or the opposite direction. This is a suitable and appropriate means to realize the required lifting function after the entrails are taken out from the abdominal cavity of the poultry.

The lifting means, for example, can be embodied as a bracket with two arms that are movable to and from each other in a generally horizontal plane. In this manner it is possible to accommodate the bracket easily to the dimensions that are required to provide a support to the entrails that are taken out of the poultry.

Best results may be achieved when the lifting means has, for example, a bracket with two arms that are arranged with an open position and a closed position, wherein the two arms are moved to the closed position when the lifting means undertake a relative upwards motion with respect to the evisceration tool. In the closed position the two arms of the bracket are closely adjacent to the evisceration tool.

Within the scope of the invention, all sorts of evisceration tools may be employed. However, in one exemplary embodiment, preferably the evisceration tool is embodied with two rotatable longitudinal arms having their body axis generally parallel. The arms are configured to move to and from each other by rotation and counter-rotation respectively. A particularly suitable exemplary embodiment of the evisceration tool is then that the two rotatable longitudinal arms are mounted at a first end in a holder and are connected to each other at a second end distant from the first end.

With this exemplary evisceration tool, it is possible that after moving the evisceration tool into the abdominal cavity of the poultry, the evisceration tool clamps the entrails, preferably at the oesophagus. This occurs preferably when the arms are rotated towards each other and prior to moving the evisceration tool out of the abdominal cavity of the poultry. In this manner it is possible to remove virtually all entrails from any poultry, whereas other evisceration tools that do not provide a clamping action may have relatively poor results. It is known from one particular evisceration tool that does not provide a clamping action, that up to 4% of the entrails packages are not removed from the abdominal cavity of the poultry, thus causing additional costs for the then necessitated manual handling.

In one exemplary embodiment, the best results for the clamping action of the evisceration tool are achieved by providing each of the two rotatable longitudinal arms with a C-shape between their first end and second end.

In another exemplary embodiment, it is preferred that the entrails are gripped and taken from the evisceration tool by gripping means that form part of conveyor means that transport the entrails to further processing means for the entrails, preferably arranged for the separation and harvesting of organs comprised in the entrails.

Although the evisceration tool and the lifting means can be arranged aside a linear track of a conveyor from which the poultry is suspended, in another exemplary embodiment it is advantageous that the evisceration tool and the lifting means are part of a rotary machine. Such a rotary machine is beneficial in terms of both design engineering and reliability as well as processing speed.

The invention will hereinafter be further elucidated with reference to the appended drawing which is not limiting as to the appended claims.

BRIEF DESCRIPTION OF THE DRAWINGS

FIGS. 1a through 1e show an exemplary sequence of events when eviscerating poultry suspended by the legs.

FIG. 2 shows the introduction of an exemplary lifting bracket to at least partly lift the entrails from the evisceration tool.

FIG. 3 shows approaching exemplary gripping means that are intended to grip the entrails.

FIG. 4 shows the exemplary gripping means after gripping the entrails and removing the entrails from the exemplary evisceration tool.

FIGS. 6, 7, 8, and 9 show an exemplary preferred rotary machine embodied with an exemplary poultry carrier, evisceration tool, and a lifting bracket; and FIGS. 10 and 11 show the lifting bracket in the open and closed position, respectively.

Whenever in the figures the same reference numerals are applied, these numerals refer to the same parts.

DETAILED DESCRIPTION

Figure 5:
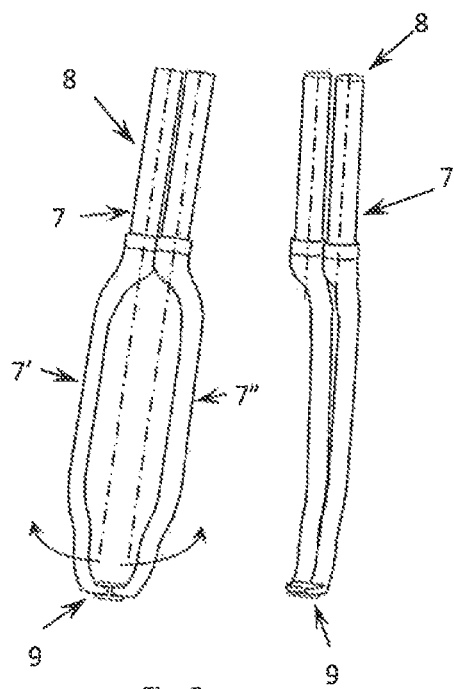
FIG. 5 schematically shows an exemplary preferred evisceration tool.
Figure 6:
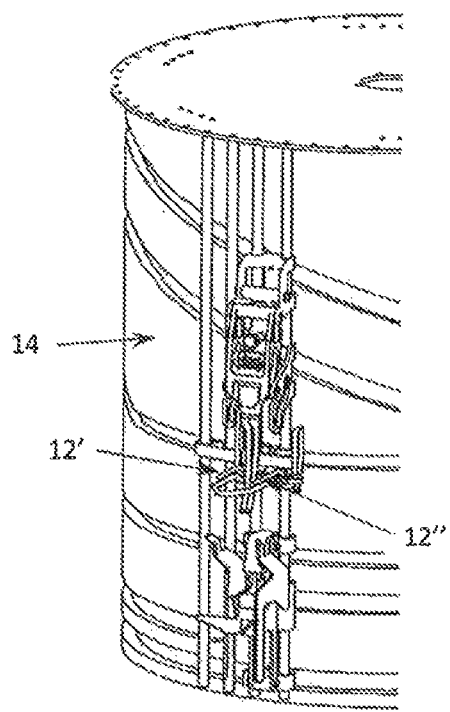
Figure 7:
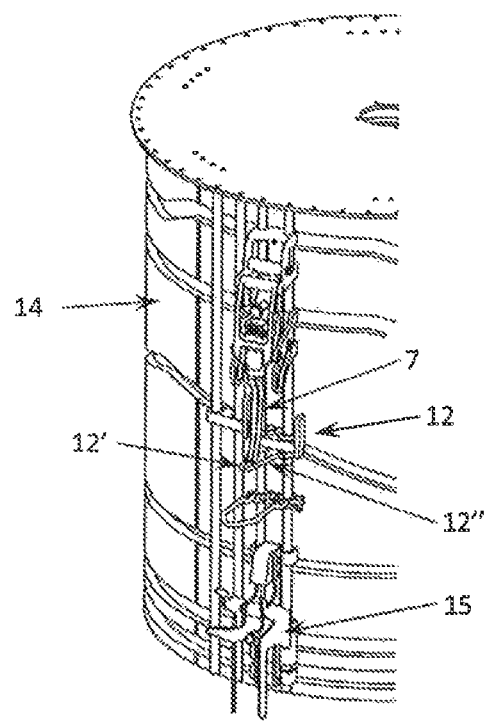

Reference is first made to FIGS. 1a through 1e, which schematically show an exemplary method for removing entrails from an abdominal cavity of poultry 1 suspended by the legs 2. These entrails (the complete package hereinafter referred to with reference 11) includes heart 3, liver 4, gizzard 5 and pre-gizzard and oesophagus 6. The poultry 1 is suspended by its legs 2 in shackles 19 of a first conveyor 10, and during the poultry's transportation in the conveying direction of the shackles 19 an evisceration tool 7 is moved into the abdominal cavity of the poultry as shown in FIGS. 1a through 1c.

FIG. 5 shows a preferred exemplary embodiment of the evisceration tool 7. Notably this evisceration tool 7 is embodied with two rotatable longitudinal arms 7', 7" having their body axis generally parallel, and which are configured to move to and from each other by rotation and counter-rotation respectively, which is indicated by the arrows. The two rotatable longitudinal arms 7', 7" are mounted at a first end 8 in a holder (not shown), and are connected to each other at a second end 9 distant from the first end 8. Further the two rotatable longitudinal arms 7', 7" each have a C-shape between their first end 8 and second end 9 which supports that the two rotatable longitudinal arms 7', 7" are arranged to clamp the entrails in the abdominal cavity of the poultry 1 when the arms 7', 7" are rotated and moved towards each other as is shown in the right-hand portion of FIG. 5 and in FIG. 1c.

After the evisceration tool 7 has reached the position of FIG. 1c, the evisceration tool 7 clamps the entrails preferably at or near the oesophagus 6 prior to moving the evisceration tool 7 out of the abdominal cavity of the poultry 1. After reaching the position shown in FIG. 1c, the tool 7 is moved out of the abdominal cavity of the poultry 1 for removing the entrails 11 from the poultry's abdominal cavity. This is shown in FIGS. 1d and 1e.

In FIG. 2, the situation is shown that is present after removal of the entrails 11 from the poultry's abdominal cavity. FIG. 2 shows further the lifting bracket 12 approaching the evisceration tool 7 from below, with which the entrails 11 will be lifted from the evisceration tool 7 as is shown in FIG. 3. FIG. 3 also shows the gripping tool 13 which comes into action after the lifting means 12 have been introduced below the evisceration tool 7 after its removal with the entrails 11 from the poultry's abdominal cavity. The lifting means 12 undertake a relative upwards motion with respect to the evisceration tool 7 so as to lift the entrails 11 at least in part from the evisceration tool 7 and give way to enable the gripping means 13 to grip the entrails 11 below the lifting means 12.

The gripping means 13 preferably grip the entrails 11 at or near to the oesophagus 6. The gripping means 13 form part of conveyor means transporting the entrails 11 thereafter in a transport direction indicated with arrow A (FIG. 4) to a not shown processing means for the separation and harvesting of organs included in the entrails 11.

FIGS. 10 and 11 give a detailed view of the lifting means and show that these lifting means 12 include a bracket that is vertically movable as indicated with arrow B in FIG. 10. The lifting means 12 are embodied as a bracket with two arms 12', 12" that are movable to and from each other in a generally horizontal plane. FIG. 10 shows that the two arms 12', 12" are in the open position, whereas FIG. 11 shows the two arms 12', 12" in the closed position.

The evisceration tool 7 of FIG. 5 and the lifting means 12 of FIGS. 10 and 11 are part of a rotary machine 14 which is shown in FIGS. 6, 7, 8 and 9 without the poultry which, during use of the machine, is suspended by the legs and fixed against a poultry support 15 mounted on the machine 14.

After the two arms 12', 12" of the lifting means 12 are moved from the open position (shown in FIG. 6) to the closed position (shown in FIG. 7), the lifting means 12 undertake a relative upwards motion with respect to the evisceration tool 7 which is shown in FIG. 8. In the closed position, the two arms 12', 12" of the bracket are closely adjacent to the arms of the evisceration tool 7. At that time also the gripping means 13 approach the evisceration tool 7 for taking over the entrails that are removed from the poultry's abdominal cavity. In FIG. 9 the two arms 12', 12" of the lifting bracket are in the open position and the gripping means 13 can transfer the entrails away from the evisceration tool 7 mounted on the rotary machine 14.

The inventors have found that in comparison with other evisceration tools such as known from EP-B-1 248 525, the exemplary evisceration tool 7 as discussed herein is preferred due to an increased certainty of gripping and complete removal of the entrails from the poultry's abdominal cavity. The exemplary apparatus and exemplary method as disclosed herein therefore result in safe processing of the poultry and reliable evisceration. Also the manner of picking over the entrails from the evisceration tool by the gripping means is reliable and secure and the repeatability regarding the gripping near or at the oesophagus is high, enabling effective harvesting of organs from the entrails thereafter.

The inventors point out that the disclosure of the invention as provided herein relates to a preferred embodiment, yet the appended claims should not be regarded as being limited to this specific preferred embodiment. On the contrary, the claims should be understood and construed in the broadest possible way, and the discussed embodiment should therefore only be understood as explanatory regarding the meaning of these claims.

What is claimed is:

1. A method for removing entrails from an abdominal cavity of poultry using an evisceration tool, the evisceration tool comprising a pair of arms having parallel body axes, each arm extending longitudinally between a first end and a second end, the entrails comprising a heart, liver, gizzard, pre-gizzard and oesophagus, the method comprising:

suspending the poultry by legs of the poultry in a first conveyor;

moving an evisceration tool into the abdominal cavity of the poultry;

clamping the entrails by rotating the arms of the evisceration tool towards each other while maintaining the body axes of the arms parallel to each other;

removing the evisceration tool from the abdominal cavity of the poultry so as to remove the entrails from the abdominal cavity;

lifting, at least in part, the entrails up and away from the second end of each arm of the evisceration tool after the removing of the evisceration tool from the abdominal cavity; and gripping and taking the entrails from the evisceration tool.

2. The method of claim 1, wherein the clamping step comprises clamping the entrails at the oesophagus after moving the evisceration tool into the abdominal cavity of the poultry and prior to removing the evisceration tool from the abdominal cavity of the poultry.

3. The method according to claim 1, further comprising the steps of:

gripping and taking the entrails from the evisceration tool by gripping means that form part of conveyor means transporting the entrails to processing means for the separation and harvesting of organs comprised in the entrails.

4. An apparatus for removal of the entrails from poultry, the poultry having an abdominal cavity, the apparatus comprising:

an evisceration tool configured for movement into, and out of, the abdominal cavity of the poultry, the evisceration tool comprising a pair of rotatable arms, each arm having a longitudinal body axis extending between a first end and a second end at which the rotatable arms are connected, wherein the longitudinal body axes of the of the arms are generally parallel and are rotatable towards and away from each other;

a lifting bracket comprising a pair of arms movable towards and away from each other, the lifting bracket positioned below the evisceration tool after its removal from the abdominal cavity, the lifting bracket configured for upwards movement from a position below the second end of each arm of the evisceration tool to a position above the second end of each arm of the evisceration tool so as to lift at least part of the entrails off of the evisceration tool; and gripping means positioned below the lifting bracket after its lifting of at least part of the entrails off the evisceration tool.

5. The apparatus of claim 4, wherein the arms of the lifting bracket are movable within a generally horizontal plane.

6. The apparatus of claim 5, wherein the arms of the lifting bracket are movable between an open position and a closed position, and wherein the arms are moved to the closed position when the lifting bracket undertakes a relative upwards motion with respect to the evisceration tool, and wherein in the closed position the arms of the lifting bracket are closely adjacent to the evisceration tool.

7. The apparatus of claim 5, wherein the arms of the evisceration tool pivot about the second end during rotation towards and away from each other.

8. The apparatus of claim 7, wherein the arms of the evisceration tool are mounted at the first end in a holder.

9. The apparatus of claim 8, wherein the two rotatable longitudinal arms each have a C-shape between their first end and second end.

10. The apparatus of claim 9, wherein the two rotatable longitudinal arms are arranged to clamp the entrails in the abdominal cavity of the poultry when the arms are rotated and moved towards each other.

11. The apparatus of claim 10, wherein the gripping means comprise a conveyor for transporting the entrails taken out of the abdominal cavity of the poultry to further processing means for the entrails.

12. The apparatus of claim 11, wherein the evisceration tool and the lifting means are part of a rotary machine.

* * * * *